Oct. 8, 1935.  C. EICHENAUER  2,016,709
RECORD COMPARING AND POSTING MACHINE
Filed Aug. 25, 1932   11 Sheets-Sheet 2
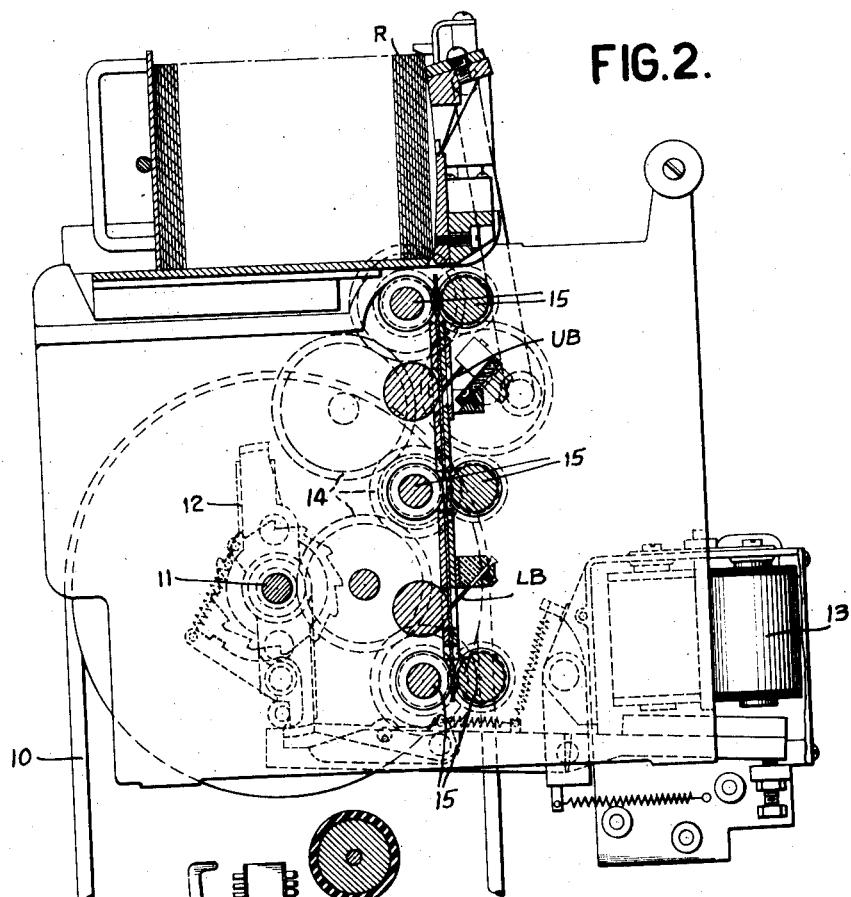
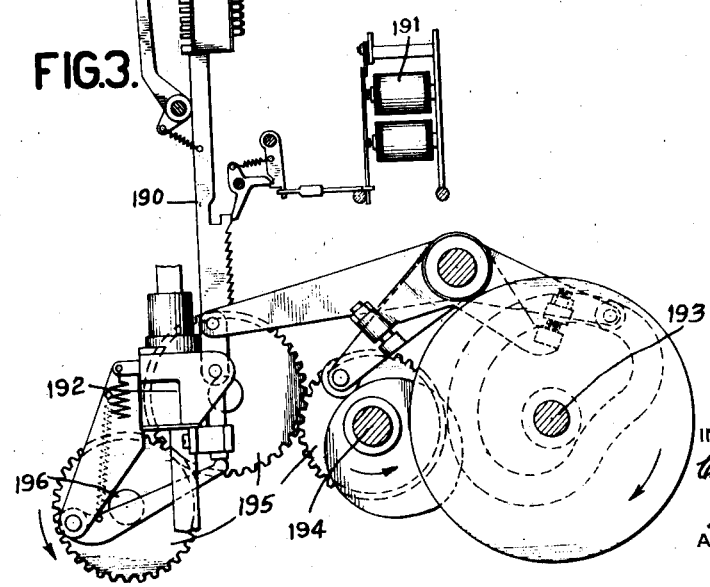

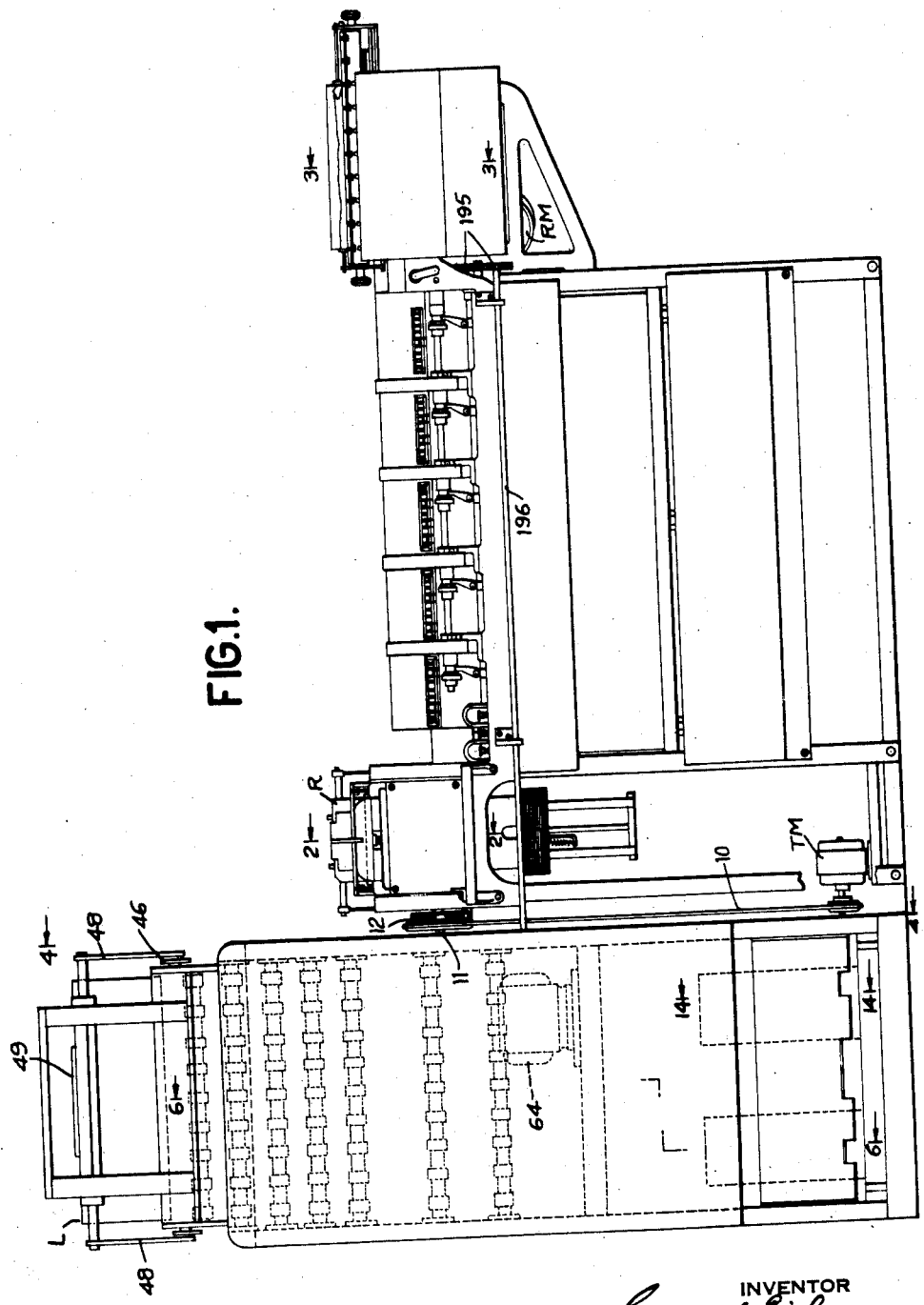

Oct. 8, 1935.  C. EICHENAUER  2,016,709
RECORD COMPARING AND POSTING MACHINE
Filed Aug. 25, 1932   11 Sheets-Sheet 3
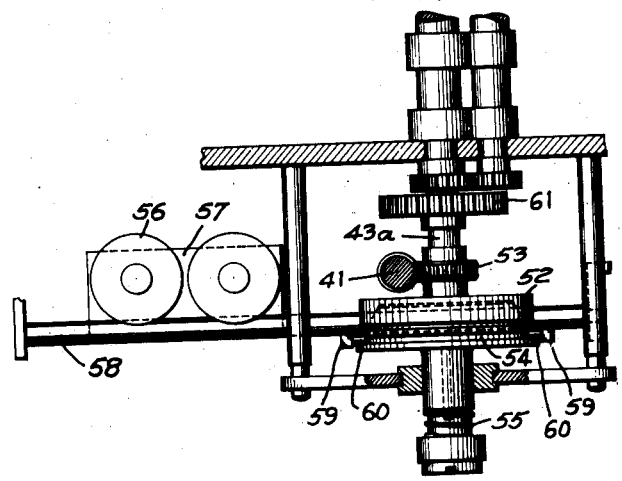
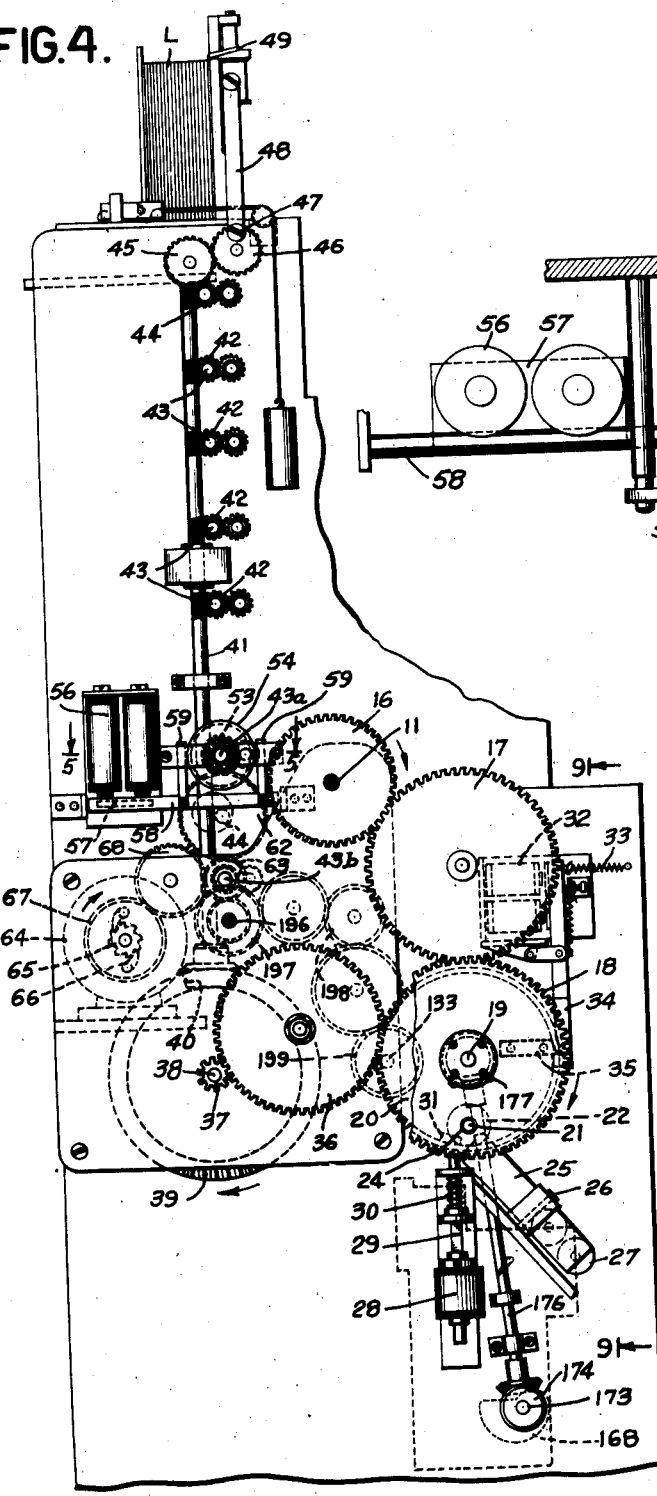
INVENTOR
Conrad Eichenauer
BY
ATTORNEY

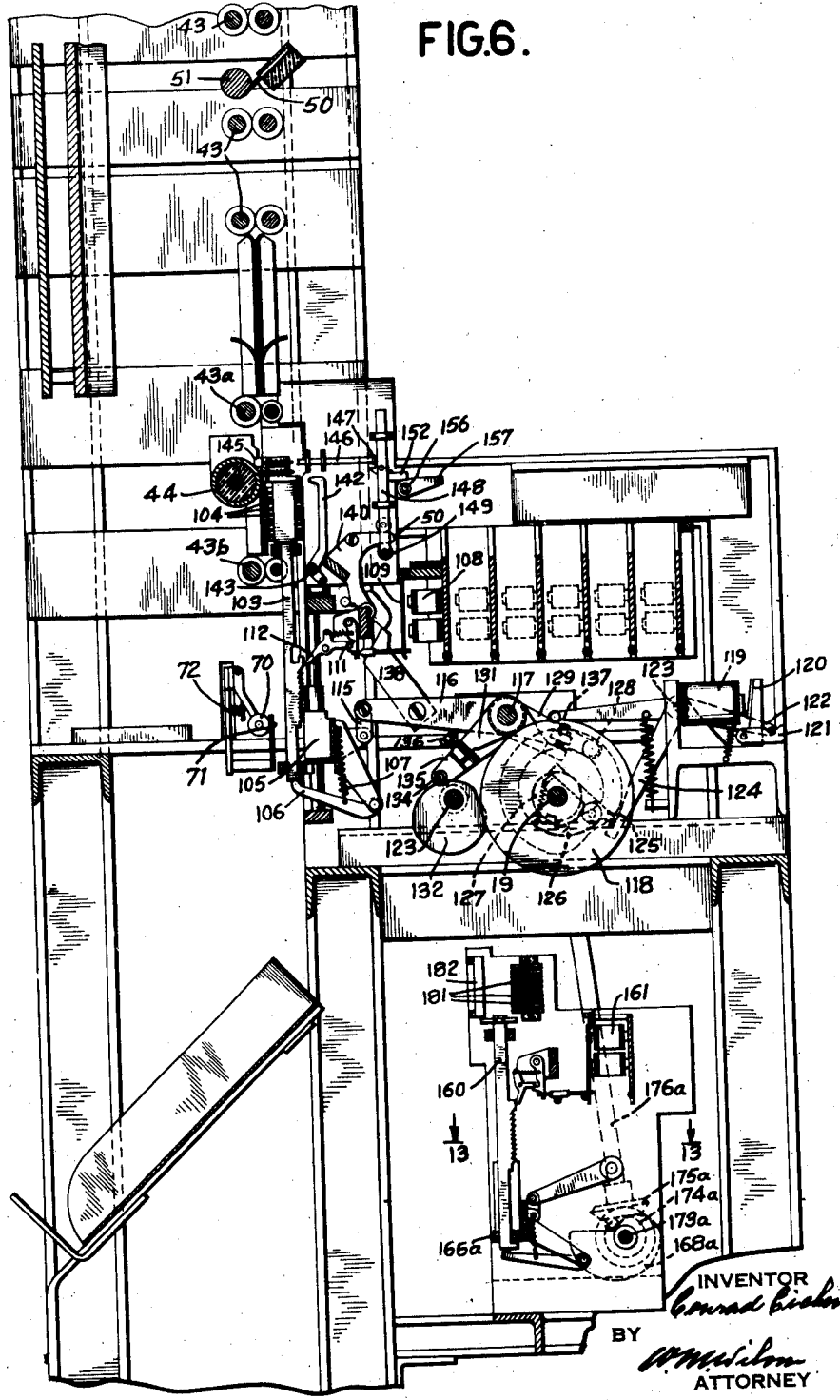

Oct. 8, 1935.  C. EICHENAUER  2,016,709

RECORD COMPARING AND POSTING MACHINE

Filed Aug. 25, 1932   11 Sheets-Sheet 5

INVENTOR
Conrad Eichenauer
BY
ATTORNEY

Oct. 8, 1935.  C. EICHENAUER  2,016,709
RECORD COMPARING AND POSTING MACHINE
Filed Aug. 25, 1932   11 Sheets-Sheet 7

INVENTOR
Conrad Eichenauer
BY
W. M. Wilson
ATTORNEY

Oct. 8, 1935.   C. EICHENAUER   2,016,709
RECORD COMPARING AND POSTING MACHINE
Filed Aug. 25, 1932   11 Sheets-Sheet 8
FIG.14.
FIG.15.
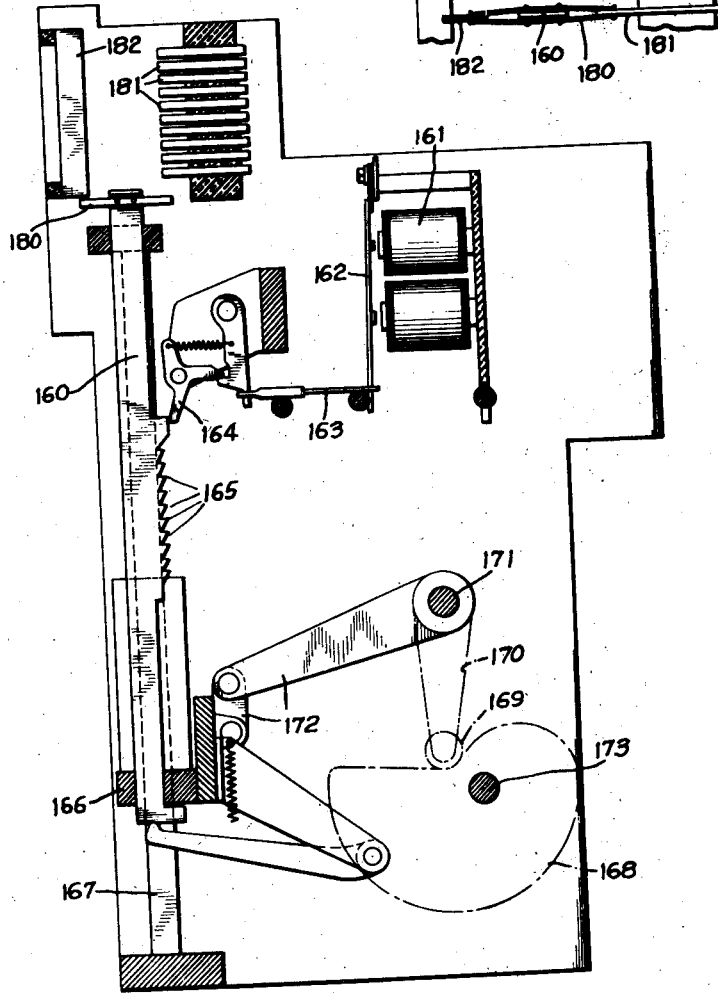
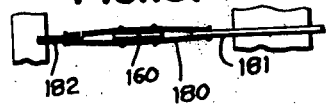
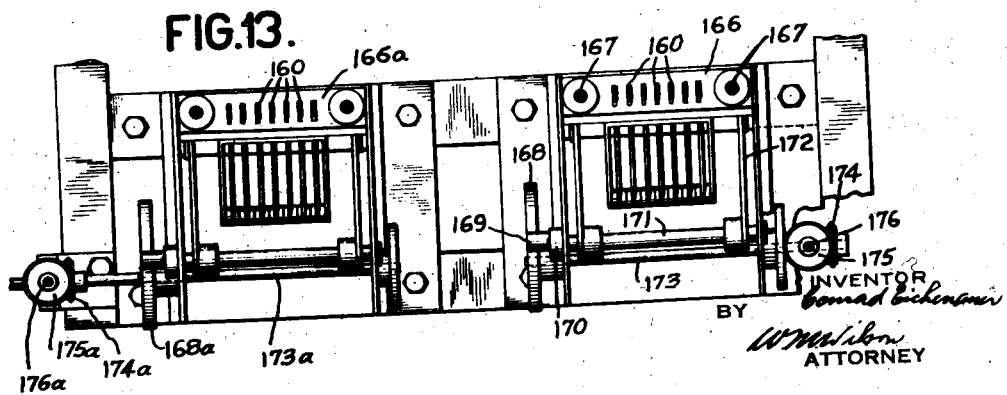
FIG.13.
INVENTOR
Conrad Eichenauer
BY
W. M. Wilson
ATTORNEY Oct. 8, 1935.  C. EICHENAUER  2,016,709

RECORD COMPARING AND POSTING MACHINE

Filed Aug. 25, 1932   11 Sheets-Sheet 11

INVENTOR
Conrad Eichenauer
BY
W. M. Wilson
ATTORNEY

Patented Oct. 8, 1935

2,016,709

UNITED STATES PATENT OFFICE 2,016,709

RECORD COMPARING AND POSTING MACHINE

Conrad Eichenauer, Leuna, near Merseburg Saale, Germany, assignor, by mesne assignments, to International Business Machines Corporation, New York, N. Y., a corporation of New York Application August 25, 1932, Serial No. 630,350
In Germany September 8, 1931

15 Claims. (Cl. 101—93)

This invention concerns tabulating machines and more particularly machines of the class in which perforated record cards control the preparation of account sheets or ledgers.

The main object of the invention is to provide a posting mechanism for tabulating machines or the like, in which provision is made for selectively feeding classified ledger sheets to a posting or printing device for receiving data of the same classification.

The invention is shown as applied to a tabulating machine of the type disclosed in Patent #1,762,145 in which the usual perforated Hollerith record cards are fed through the machine and the perforated data thereon analyzed and used to control the operation of accumulating and printing mechanism. Ledger cards having perforations representing classification data are fed through the posting mechanism concurrently with the feeding of record cards through the tabulating machine. The data of the record cards is compared with the classification data on the ledger cards and if they are in agreement posting will take place on a selected line of the ledger card under control of further perforations in the record card.

The ledger card is provided with a plurality of lines upon which printing is to be effected and adjacent to the lines is a column in which a perforation is made to represent that an entry has been made on the corresponding printing line. Mechanism is provided to sense the special perforations to determine upon which line of the ledger card the next entry is to be made.

A further arrangement of the invention provides for the feeding of a group of record cards through the tabulating machine. Ledger cards, of which there is one for each group of record cards are sent through the posting device and, upon agreement of the classification data of the first record card of a group with the corresponding data on the ledger card, further feeding of the latter through the posting device is interrupted and successive entries will be made thereon under control of the several groups of record cards. The ledger sheet is advanced step by step or line by line to receive each entry on a different printing line.

Further and other objects and advantages will be hereinafter set forth in the accompanying specification and claims, and shown in the drawings, which by way of illustration show what is now considered to be the preferred embodiment of the invention.

In the drawings:

Fig. 1 is a general assembly view of the entire apparatus showing the posting mechanism coupled to a standard Hollerith electrical tabulating machine;

Fig. 2 is a section taken on line 2—2 of Fig. 1, showing the card feeding mechanism of the tabulating machine;

Fig. 3 is a section taken on line 3—3 of Fig. 1, showing the printing mechanism of the tabulator in diagrammatic form;

Fig. 4 is a section taken on line 4—4 of Fig. 1, showing the driving mechanism of the posting section;

Fig. 5 is a detail of the ledger card feeding control, the section being taken on the line 5—5 of Fig. 4;

Fig. 6 is a section taken on line 6—6 of Fig. 1, showing a central section through the posting mechanism;

Fig. 13 is a section taken on line 13—13 of Fig. 6, showing the mechanism for comparing data entries on the tabulating and ledger cards;

Fig. 14 is a section of one of the comparing units, the section showing the unit which is set under control of the tabulating or record card;

Fig. 15 is a plan detail of one of the contact devices of Fig. 14;

Figure 16:
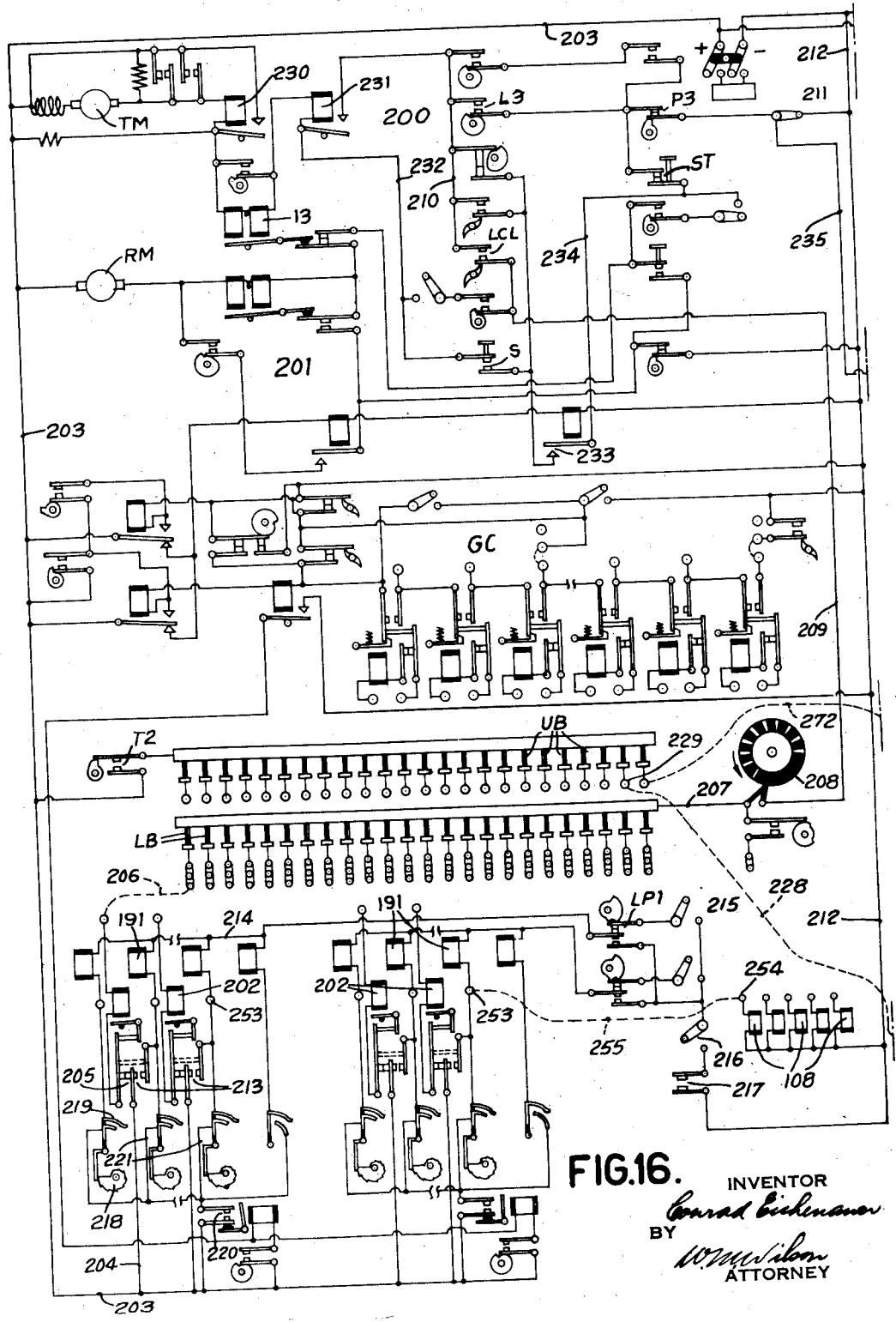
Figure 16A:
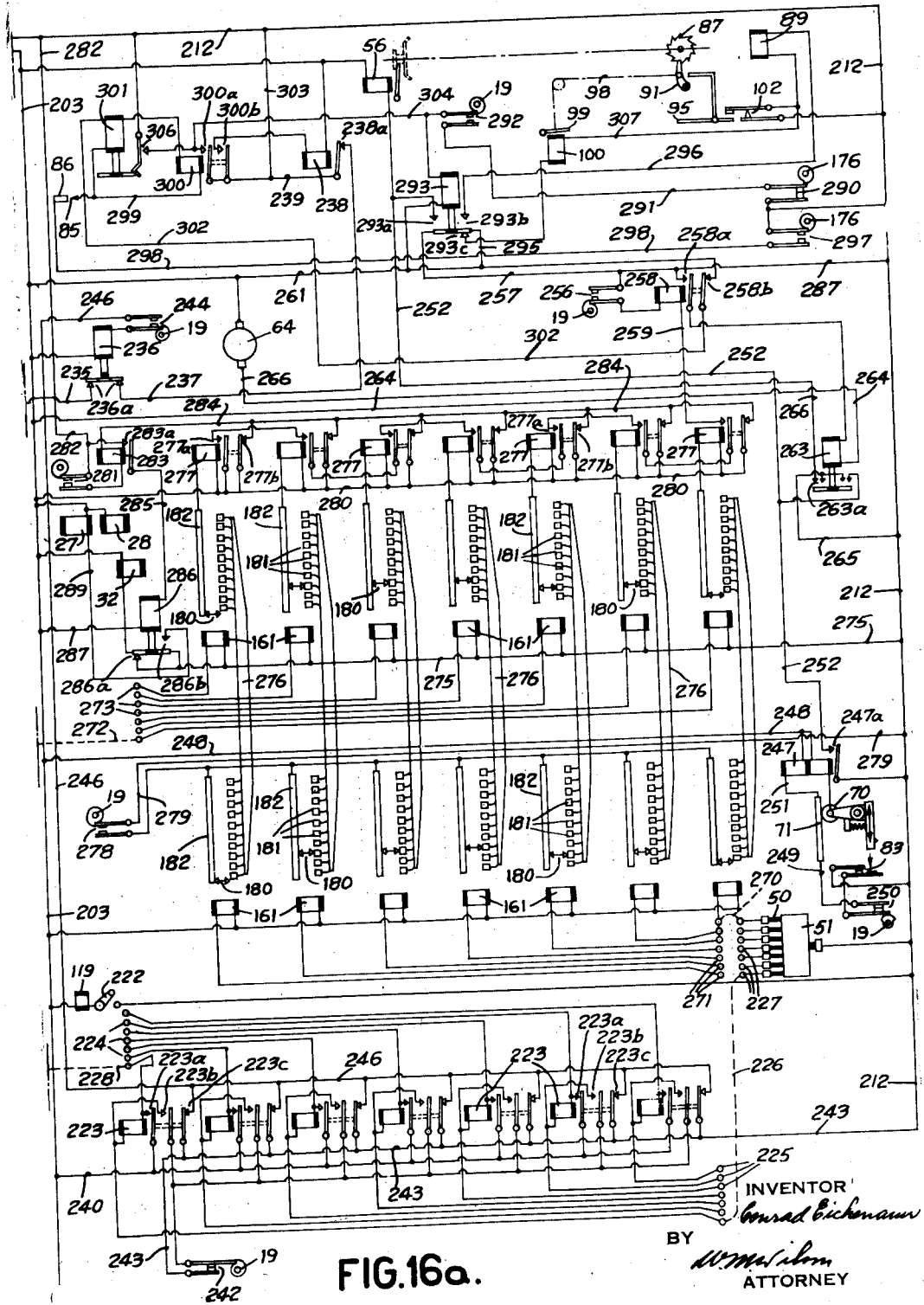

Figs. 16 and 16a taken together show a complete wiring diagram of the electric circuits of the entire apparatus, Fig. 16 including the complete circuits of a well known Hollerith tabulating machine and Fig. 16a showing the circuits required for controlling the operation of the posting mechanism;

Fig. 17 is a detail of a ledger card upon which posting is effected;

Fig. 18 is a detail of a well known Hollerith tabulating card.

The cards in Figs. 17 and 18 are not shown at the same scale, the ledger card being actually considerably larger than the tabulating card.

Record card feeding mechanism

The card feeding mechanism for feeding the Hollerith record cards is similar as shown in the Patent #1,600,413 granted to C. D. Lake on September 21, 1926 and it will therefore be but briefly described in this application.

The usual driving motor TM (Fig. 1), through belt and pulley 10 drives the usual card feed operating shaft 11 through the usual card feed clutch mechanism, generally designated as 12 in Fig. 2 which is operated under control of the card feed clutch magnet 13. The usual gears 14 connected to shaft 11 are adapted to operate the pairs of feed rollers 15 to advance the record cards R one at a time from the feed magazine and move them past the upper brushes UB and exactly one machine cycle later past the lower brushes LB.

Figure 9:
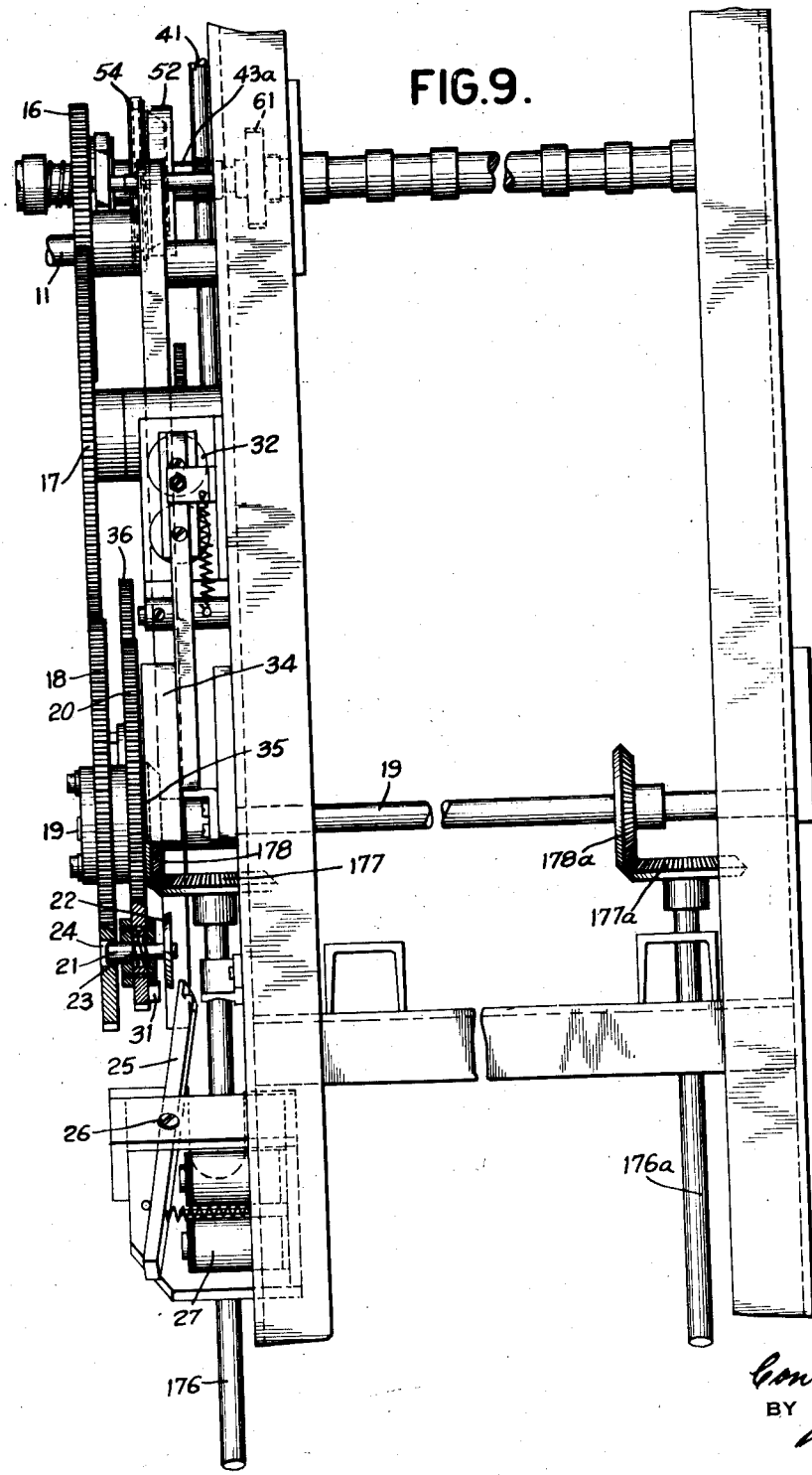
Fig. 9 is a view looking in the direction of arrows 9—9 on Fig. 4, showing certain of the clutching devices associated with the posting mechanism.

Referring to Fig. 4 the pulley shaft of the tabulator carries a gear 16 which, through an idler 17, is adapted to drive a gear 18 secured to a shaft 19 (see also Fig. 9) which gear has driving connection with a gear 20 loose on shaft 19. The driving connection between gear 18 and gear 20 comprises a pin 21 carried by the gear 20 and having disks 22 secured to one end thereof. A spring 23 is adapted to cooperate with a shoulder of pin 21 to urge the latter into engagement with a suitable opening 24 in the gear 18. With the parts in the position as shown in Fig. 9 driving connection is effected between the two gears so that rotation of gear 18 will carry with it, gear 20.

Disengagement of the parts is effected by an armature member 25 pivoted at 26 which upon energization of magnet 27 is adapted to be rocked about pivot 26 so that its upper end is moved into the path of the disk 22. This upper end is wedge shaped so that as the disk 22 passes the end of member 25 the disk will be cammed in a direction away from gear 18 drawing pin 21 with it.

Connected in parallel with magnet 26 is a stop magnet 28, which, upon simultaneous energization with magnet 27 will draw a rod 29 upwardly against the action of a spring 30 thereby raising rod 29 into the path of a block 31 carried by gear 20. The function of the cooperation between rod 29 and block 31 is to positively stop further rotation of gear 20 upon withdrawal of pin 21 by the armature member 25 so that the gear 20 will remain at rest. A further magnet 32 is provided which is adapted to be deenergized at the same time that magnets 27 and 28 are energized. The energization of magnet 32 will permit spring 33 to rock armature 34 in a clockwise direction as viewed in Fig. 4 so that its lower end will move into cooperation with a stopping block 35 which is secured to gear 20 thus furnishing an additional positive stopping effect upon gear 20. The circuits which control the magnets 27, 28 and 32 will be set forth in detail in connection with the explanation of the circuit diagram.

With gear 20 coupled to gear 18 the drive from shaft will continue through gear 36 and pinion 37 to a shaft 38 which also carries a bevel gear 39 which meshes with a bevel pinion 40 secured to the lower end of a vertical shaft 41. Shaft 41 is the ledger card feeding shaft and carries threads thereon cooperating with worm gears 42. Gears 42 are carried at the extremity of card feed roller shafts 43 which are adapted to convey the ledger cards L from their feed magazine vertically downward into cooperation with the printing platen 44 (see also Fig. 6).

The uppermost feeding roll shaft 43 (Fig. 4) carries a spur gear 44 which meshes with an idler 45 which in turn drives a gear 46 upon which is carried an eccentric pin 47. A link 48 connected to pin 47, has connection at its other end with the card picker knife 49 of the usual type. The action is such, that, for each revolution of gear 46, picker 49 will move one card downwardly from the magazine and into engagement with the first set of feed rollers.

Referring now to Fig. 6 analyzing brushes 50 and cooperating contact roll 51 are located in the path of the ledger card L and are adapted to analyze index point perforations in such card as it passes thereby. Movement of the index point positions of the ledger cards past brushes 50 is synchronized with the movement of the corresponding index point positions of the record card R past the upper brushes UB of the tabulating machine. A comparison is made between the data sensed by the brushes 50 and UB and if they are found to be in agreement further feeding of the ledger card L will be interrupted and the ledger card will be held in cooperation with platen 44 so that printing may take place of the ledger cards under control of other data on the record card R.

The relationship of the various mechanisms of the machine is such that, as the ledger card is feeding downward past brushes 50, the record card R is passing the corresponding upper brushes in the tabulating machine. As the ledger card is advanced toward the platen 44 and positioned to receive printing upon the proper line, the corresponding record card R is being advanced past the lower brushes LB which will control the positioning of the printing mechanism in the posting section of the machine.

The manner in which further feeding of the ledger card L is interrupted will now be explained. Roller shaft 43a (Figs. 4 and 5) disposed immediately above platen 44 has driving connection with vertical shaft 41 through a friction clutch comprising a driving member 52 loose on shaft 43a and integral with a worm 53 also loose on the shaft and in mesh with a threaded section of shaft 41. Keyed to shaft 43a and slidable axially thereon is a driven member 54 urged into engagement with driving member 52 by a spring 55. A magnet 56 upon energization will attract its armature 57 to rock a rod 58 which carries upstanding arms 59 whose free ends carry rollers 60. The rollers ride in a suitable groove in member 54 and serve to withdraw the member from engagement with driving member 52 when magnet 56 is energized.

After printing has been effected on the ledger card it is removed from printing position by the following mechanism. Shaft 43a has secured thereto a gear 61 (Fig. 5) meshing with an idler 62 which in turn meshes with a gear 63 carried by the roller shaft 43b below platen 44. A motor 64 (Fig. 4) carries a ratchet 65 at the extremity of its shaft and through pawls 66 is adapted to drive a gear 67 to which the pawls are pivoted. An idler 68 serves to furnish driving connection between gears 63 and 67. Current is supplied to motor 64 after posting has been effected and while clutch 52, 54 is disengaged so that roller shafts 43a and 43b may feed the card downwardly to the discharge magazine. It is to be noted that shaft 43b does not have connection with vertical shaft 41.

Line finding mechanism

The point at which magnet 56 is energized to interrupt card feeding is determined in accordance with the location of the line of the ledger card with respect to the leading edge thereof upon which printing is to be effected. To this end a contact roller 70 and a contact block 71 (Fig. 6) which are disposed in the path of the descending ledger card L may be adjustably positioned up and down so that the leading edge of the card will engage roller 70 when a selected line of the card is in printing position. Upon such engagement a circuit through 70 and 71 is opened, resulting in energization of magnet 56 in a manner to be set forth in connection with the description of the circuit diagram. Roller 70 and block 71 are carried by a plate 72 which extends through the side frame of the machine and connects to a block 74 (see also Figs. 10 and 11) which is guided for vertical movement in suitable guides 75.

Block 74 has an extension 76 terminating in a handle 77 which cooperates with a fixed scale 78. Pivoted to handle 77 is a locating and indicating finger 79 which cooperates with a plurality of holes 80 in the plate 78.

Block 74 may be locked in any vertical position represented on scale 78 so that the connected roller 70 and block 71 may be variously positioned with respect to platen 44. Block 74 has a cam surface 81 integral therewith which, when the block is in lowermost position is adapted to cooperate with a spring blade 82 to move the same towards the left to open a pair of contacts 83. Opening of contacts 83 will disable clutch magnet 56 in a manner to be more fully set forth in connection with the circuit diagram wherein this feature of the invention will be more fully set forth.

Referring now to Fig. 17, the ledger card L may be provided with a column indicated at 84 in which a perforation may be made for each line printed upon the ledger sheet and for certain classes of work this perforation is used to determine the relative position of the ledger card with respect to the platen 44.

Figure 7:
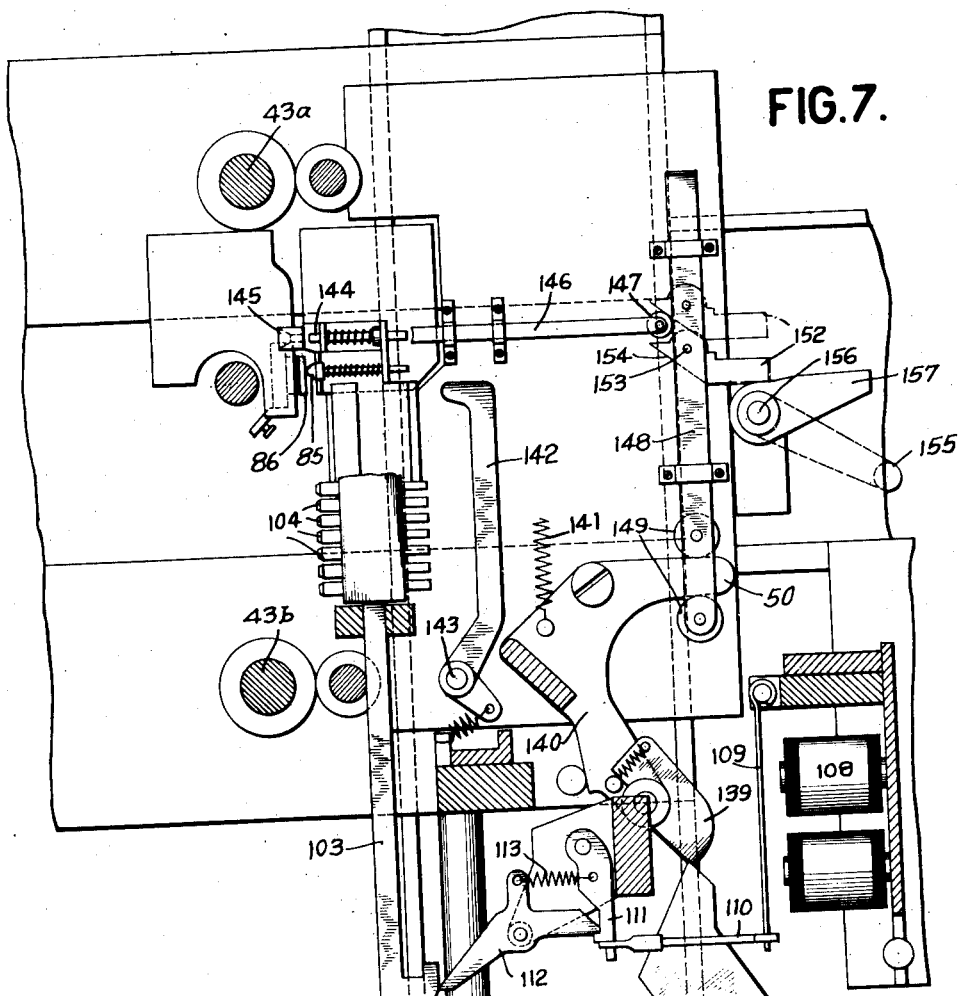
Fig. 7 is an enlarged detail of the printing and punching devices shown in Fig. 6.
Figure 11:
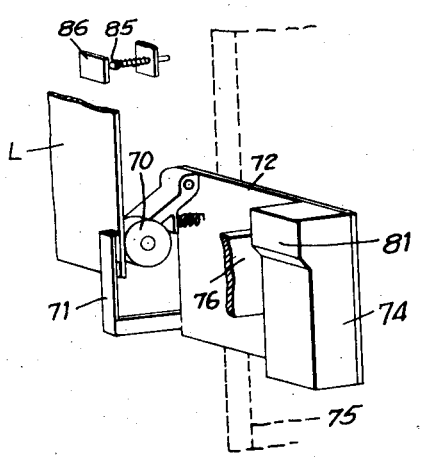
Fig. 11 is a detail of a contact device located by the mechanism shown in Fig. 10.

Referring to Figs. 7 and 11 a special brush 85 and cooperating contact block 86 are disposed in the path of column 84 and arranged on the printing line. As the ledger card moves downwardly through the feeding rollers the engagement of the perforations in column 84 with brush 85 will complete circuits which, as will be explained in connection with the circuit diagram control step by step feeding mechanism for advancing the ledger card line by line to receive successive entries. This mechanism will now be described.

Figure 12:
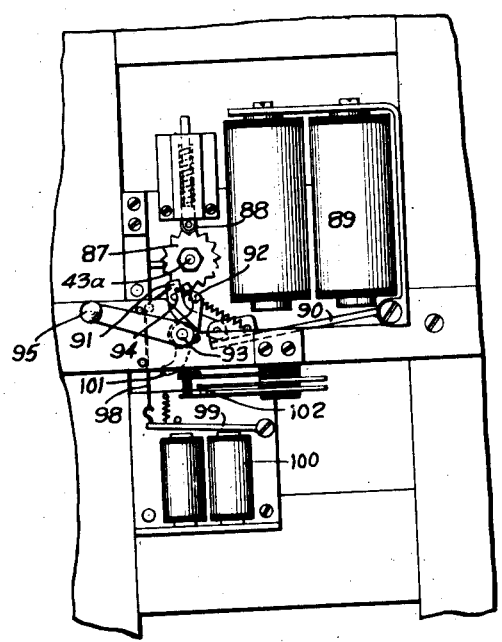
Fig. 12 is a detail of the line spacing mechanism of the posting device.

In Fig. 12 the feed roller 43a is shown as having a star wheel 87 secured to its outer end and resiliently held in position by a spring pressed roller 88. Energization of a magnet 89 will draw upwardly on armature 90 the free end of which carries a stepping pawl 91 spring pressed into engagement with star wheel 87. The consequent actuation of shaft 43a will turn the associated feed rollers to retract the ledger card one step or one printing line. It will be appreciated that at such time the two lower pairs of feed rollers will be free from engagement with the vertical card feed drive shaft 41 and the motor 64. Means is provided in the form of an arm 92 pivoted on a rod 93 and adapted, upon counterclockwise rotation to engage a pin 94 extending from pawl 91. Rod 93 carries a handle 95 at its extremity which when rocked downwardly from the position shown in Fig. 12 rocks the pawl 91 out of engagement with the star wheel 87. Pawl 91 is also connected by means of a flexible connection 98 with the free end of armature 99 of a magnet 100, so that energization of magnet 100 will draw upon connection 98 to rock pawl 91 out of engagement with the star wheel 87.

An extension 101 secured to rod 93 will cooperate with a pair of contacts 102 to open the same when the rod 93 is rocked in a counterclockwise direction.

Posting mechanism

The mechanism for effecting printing on the ledger card will now be explained in connection with Figs. 6 and 7.

A plurality of type bars 103 are arranged for vertical reciprocation and may be differentially positioned with respect to the printing line to present any selected type 104 to the platen 44. The type bars 103 are connected to the crosshead member 105 through the usual resilient connection comprising arms 106 whose free ends abut the lower ends of the type bars and which are held in such engagement by springs 107. As the crosshead 105 is moved upwardly, the type bars 103 will move likewise under the influence of the springs 107 and arms 106. Printing magnets 108 will, upon energization, attract its armature 109 to draw call wire 110 toward the right to release a latch 111 so that a stopping pawl 112 may be rocked by spring 113 into the path of the teeth 114 integral with the type bar 103. The type bar will thus be interrupted in a position depending upon the time of energization of magnet 108; crosshead 105 will, however, continue upward to the end of its stroke and springs 107 will extend to permit the type bar 103 to remain in its selected position. Crosshead 105 has link connection 115 with an arm 116 fixedly connected upon a cross shaft 117.

A box cam 118 loose on shaft 19 is adapted to be coupled thereto upon energization of a magnet 119. Energization of magnet 119 attracts its armature 120 to rock member 121 integral with the armature. Rocking of member 121 will cam an arm 122 in a counterclockwise direction about pivot 123 to which it is secured and to which is also fastened a clutch releasing latch 124 whose free end is in engagement with extension 125 of clutching dog 126 carried by box cam 118.

Shaft 19 has fixed thereto, driving member 127 adapted to be engaged by dog 126 upon release thereof by arm 124. Upon such release, box cam 118 will be driven by shaft 19 and roller 128 riding in the groove of the box cam will cause arm 129 to oscillate. Arm 129 is loosely mounted upon shaft 117 and has an adjustable screw connection 137 with a double arm 131 attached to shaft 117. It will thus be apparent that rotation of box cam 118 will rock shaft 117 and consequently reciprocate the crosshead 105 to elevate and lower the type bars 103.

The operation is such that the several type 104 move upwardly past printing position as the corresponding index point positions or the record cards R of the tabulating machine are successively passing the lower analyzing brushes LB, so that circuits completed through perforations in these index point positions will instantaneously complete circuits through the printing magnets 108 to interrupt the type bars 103 with the type 104 corresponding to the perforations on the printing line. Crosshead 105 may also be operated under control of a cam 132 mounted upon a shaft 133 which is adapted to be operated under control of the total taking and resetting mechanism of the tabulating machine. A roller 134 cooperating with cam 132 is carried by an arm 135 loosely pivoted on shaft 117 and having adjustable screw connection 136 with double arm 131 rigidly secured to shaft 117. This manner of connection to shaft 117 is usual in the art and permits shaft 117 to be rocked by either cam 118 mounted on shaft 19 or cam 132 mounted on shaft 133.

Upon the completion of the upward movement of crosshead 105 printing from the selected type will be effected in the following manner.

Arm 116 has secured thereto (Fig. 7) a member 138 which, as the arm 116 rocks in a clockwise direction, is adapted to engage the end of a pawl 139 carried by the hammer tripping bail structure 140. Bail 140 will thereupon be rocked in a counterclockwise direction against the tension of its actuating spring 141. Printing hammers 142, pivoted at 143, are normally spring urged into engagement with bail 140 so that as the bail is retracted the hammers will move away from the type element 104. As the member 138 reaches the extremity of its movement, pawl 139 will be released and spring 141 will actuate the bail 140 in a clockwise direction urging the hammers 142 forcibly to effect printing the type elements 104 from those types which are positioned at the printing line.

Pawl 139 is resiliently connected to bail 140 to permit the arm 138 to by pass the pawl upon its return or downward movement. In Fig. 7 is shown the mechanism for effecting a punch operation in column 84 of the ledger card L as an accompaniment to each printing operation.

Punching mechanism

Located directly above the analyzing element 85 which senses the perforation in column 84 of the ledger card is a punch 144 and a cooperating die 145. In axial alignment with the punch 144 is a plunger 146 carrying a roller 147 at one end thereof.

A vertical bar 148 having rollers 149 at its lower end is disposed in the path of movement of an arm 50 extending from bail 140. As the bail is rocked in a counterclockwise direction to extend spring 141, bar 148 will be elevated and a camming element 152 pivoted thereon at 153 will be elevated from its full line position as shown in Fig. 7 to its dotted line position rocking through substantially 90° in a counterclockwise direction as it passes from the full to the dotted line position.

Figure 8:
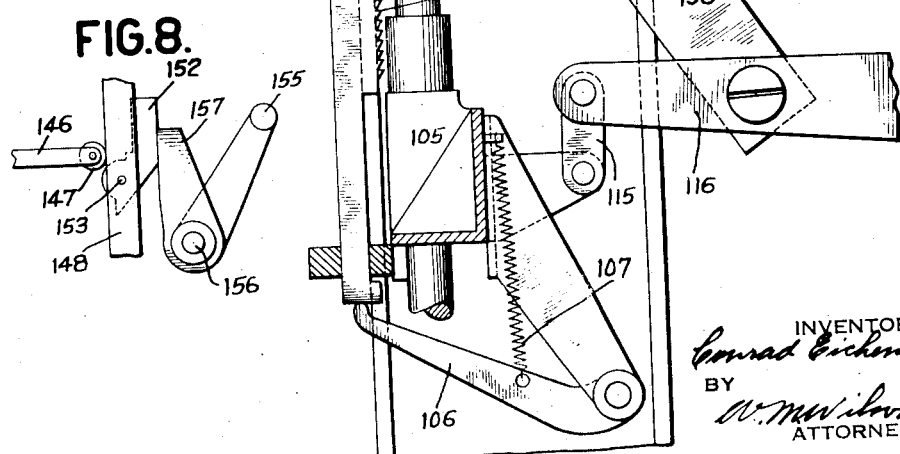
Fig. 8 is a further detail of parts shown in Fig. 7.

On the downward stroke of bar 148 a camming surface 154 of member 152 will engage roller 147 to positively move plunger 146 toward the left into engagement with punch 144 to cause a perforation to be made in the ledger card. This punching mechanism may be disabled, if desired, by rocking a handle 155 located on the outside of the machine from the position of Fig. 7 to that of Fig. 8. Handle 155 is secured to a rod 156 whose inner end carries a camming member 157 arranged in the same plane as member 152. Shifting of handle 155 to the position of Fig. 8 will cause cam 157 to engage and rock 152 to the position shown in which the reciprocation of the bar 148 will move the member 152 past roller 147 in both directions, without moving the roller sufficiently to actuate the punch.

Comparing mechanism

For the purpose of comparing the classification data on the ledger card with similar data on the record card the mechanism shown in Figs. 6, 13 and 14 is provided. Two sets of such mechanisms are utilized in the machines each of which comprises a plurality of differentially settable bars 160 adapted to be positioned under control of magnets 161 which upon energization attract the armatures 162 to draw call wires 163 toward the right to release the stopping pawls 164 so they may be rocked into engagement with the teeth 165 integral with bars 160.

A crosshead 166 of one unit (Fig. 14) is vertically movable upon guide rods 167 and is adapted to move upwardly under control of a cam 168 which cam cooperates with a roller 169 carried by its follower arm 170 secured to shaft 171. The shaft 171 has arm and link connection 172 with the crosshead 166 shown in Fig. 14.

Cam 168 (Fig. 4) is mounted upon a shaft 173 which also carries a bevelled gear 174 meshing with a bevel gear 175 secured upon an oblique shaft 176 whose upper end (see Fig. 9) also carries a bevel gear 177 meshing with a bevelled gear 178 integral with gear 20. It will be recalled that gear 20 may be disengaged from driving relationship with the gear 19 and due to its manner of connection with shaft 173 as just explained the latter shaft will also cease operation together with gear 20 when the latter is disengaged from gear 18. In Figs. 6 and 14 the crosshead 166a of the second unit is driven from a cam 168a carried by a shaft 173a. Shaft 173a has bevel gear connections 174a, 175a with a shaft 176a whose upper end has bevel gear connections 177a, 178a (Fig. 9) with shaft 19. It will thus be apparent that one of the units will operate continuously as long as shaft 19 operates while the other will only operate when the gear 20 is coupled to the gear 18 and consequently to the shaft 19. Referring again to Fig. 14 each bar 160 carries a contacting member 180 at its upper end. This member, as the bar 160 moves upwardly is adapted to successively connect a series of insulated contact blocks 181 with a common conducting bar 182. The blocks 181 of Fig. 14 correspond in number and in position to the index point positions in which classification data are perforated on the ledger cards and contact 180 is adapted to be set under control of these perforations to connect the block 181 corresponding to the perforation in a particular card column with the common bar 182. The contact bar 180 of the second unit (Fig. 6) will be similarly positioned under control of the upper brushes UB of the tabulating machine to position contact 180 in connection with the block 181 corresponding to the perforation position of the selected column of the record card. The manner in which the setting of the several bars 160 and contact blocks 180 control the comparison of the record cards R with the ledger cards L will be more fully set out in connection with the explanation of the circuit diagram.

Tabulator printing mechanism

The printing mechanism of the tabulating machine is shown severally in Fig. 3 wherein the usual type bars 190 are positioned under control of printing magnets 191 in the well known manner. The crosshead 192 may be operated under control of the list shaft 193 or total taking shaft 194 in a manner fully set forth in Patent #1,762,-145 already referred to. This printing mechanism is constructed very similarly to the printing mechanism of the posting unit and will therefore not be described in detail at this point. The total taking shaft 194 which operates the printing mechanism of the tabulating machine during total taking operations of the machine is connected by means of gears 195 to a shaft 196 which, as shown in Fig. 1 extends across the front of the tabulating machine to drive the mechanism of the posting unit as follows:

Shaft 196 (Fig. 4) carries a gear 197 at its extremity which, through several idler gears 198 drives a gear 199 secured to shaft 133. This shaft, as explained in connection with Fig. 6 causes operation of the posting mechanism and by virtue of the gear connection just traced such operation will be in synchronism with the operation of the normal tabulating machine total printing mechanism. Parallel circuits to be traced later may be completed through printing magnets 108 and 191 to effect printing of the same data on both the ledger cards and the record sheet on the tabulator printing platen under control of the total taking mechanism of the tabulator.

*Circuit diagram*

The complete operation of the machine will now be explained in connection with the circuit diagram. Fig. 16 shows the wiring arrangement of the tabulator and is substantially that of the machine shown and described in Patent #1,762,-145 already referred to. As machines of this type are well known, a detailed description thereof need not be made herein, other than to briefly outline the general operation of the machine and the manner in which it effects control of the posting unit by means of the present invention. During adding operations the machine is driven by the tabulating motor TM controlled by a group of cam and relay controlled circuits indicated at 200 and is driven during total taking and resetting operations by a reset motor RM controlled by a group of circuits, contacts and relays designated generally at 201. When the tabulating motor TM is in operation, it feeds the perforated tabulating cards R bearing differentially arranged index points representing digits, first, beneath the upper analyzing brushes UB and exactly one machine cycle later beneath the lower analyzing brushes LB. By means of the group control mechanism indicated generally at GC groups of cards as represented by the same data entry in certain selected columns, may be operated upon separately, the items of each group being accumulated and the total of them taken before the machine begins operation on the following card groups. As the perforated cards pass the lower brushes LB, their index points instantaneously close circuits through the proper lower analyzing brushes LB to energize counter magnets 202. A representative adding circuit may be traced as follows: from positive side of line 203 (Fig. 16), wire 204, normally closed contacts 205, adding magnet 202, plug connection 206 to the lower brush sockets, lower brush LB perforation in the record card, wire 207, impulse distributor 208, wire 209, lower card lever contacts LCL, wire 210, cam contacts L3, cam contacts P3, switch 211 to negative side of line 212. This is the usual adding circuit and as usual, the timed energizations of the magnets 202 control mechanism for entering the data corresponding to the card reading on the counter wheels.

When any counter magnet 202 is energized it causes contacts 213 to close, energizing a printer magnet 191 to select the type corresponding to the entered data, for printing. A representative printing circuit may be traced as follows: from positive side of line 203, wire 204, contacts 213, printer magnet 191, wire 214, upper contacts LP1, switch 215 (closed if listing is desired) switch 216, contacts 217 (closed during printing operations) and thence to positive side of line 212. In this fashion, the accumulated items may be listed. These functions do not enter specifically into the present invention and will not be described in detail as they are well understood and fully described and explained in the patents previously mentioned.

Associated with each adding wheel is the usual stepped cam 218 provided with ten steps, one for each of the ten positions which the indicating counter wheel may assume. During total taking operations, a feeler finger including contacts 219 cooperates with cam 218 and constitutes a means for timing the closure of the circuits to the printer magnets 191 when total printing is to be effected. A representative circuit may be traced as follows: from positive side of line 203, through zero button contacts 220 (which are closed when total printing is desired from the associated counter) wire 221, contacts 219, printing magnet 191, wire 214, lower contacts LP1 (closed during total printing operations) switch 216, contacts 217 to right or negative side of line 212 as before.

The mechanism and circuits just described and traced are set forth in more particular detail in the patents mentioned to which reference may be had for further detailed disclosure, and, since such mechanism forms no part of the present invention further explanation thereof is not necessary here.

It has been briefly pointed out how data may be read from record cards and entered into the accumulating mechanism from whence circuits are completed to control the printing of such entered data. It has also been pointed out how, during total taking operations, the accumulated data may be read from the accumulators and caused to control printing operations to record such totals. If the detailed listing of the individually entered items is not desired, switch 215 may be opened so that the separate items are accumulated but not printed and printing will only take place during total taking operations. This arrangement is in accordance with the well known method of operating tabulating machines of this character.

*Posting on a predetermined line*

The operation of the entire apparatus will now be described in connection with the printing on a predetermined line of each ledger card of data derived from a corresponding record card. Ledger cards and record cards both arranged in the same sequential order are placed in their respective magazines after which, a switch 222 (Fig. 16a) is closed thereby completing a circuit through the magnet 119, from line 203, through the switch to line 212. It will be recalled that energization of magnet 119 will cause the listing cam of the posting unit to become connected to the driving shaft of such unit so that upon operation of the motor TM the posting device will operate in synchronism with the printing devices of the tabulator.

Figure 10:
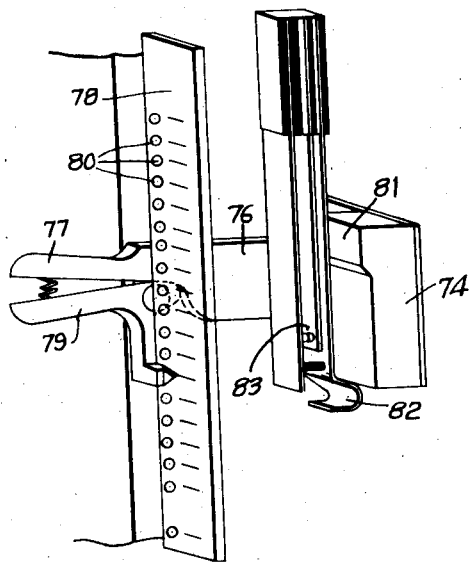
Fig. 10 is a detail in perspective of a settable device for determining the line of the ledger card upon which an entry is to be made.

The printing line selecting devices of Fig. 10 are positioned in accordance with the line upon which printing is desired to be effected.

Referring now to Fig. 16a, a plurality of control relays 233 are provided which are connected in series between a corresponding number of plug sockets 224 and 225. The sockets 225 may be connected by suitable plug connections 226 to sockets 227 associated with the ledger card analyzing brushes 50. Plug sockets 224 may be connected by suitable plug connections 228 (see also Fig. 16) to sockets 229 of the upper brushes UB of the tabulator.

Depression of the start key S, at this time, will complete the circuit through the driving motor TM as follows: from line 203 (Fig. 16), motor TM, relay coil 230, clutch magnet 13, relay coil 231, wire 232, start key S, motor control relay contact 233, wire 234, stop key contact ST, cam contact P3 to switch 211 which is open at this time, thence through wire 235 (see also Fig. 16a), contacts 236a, wire 237, contacts 238a, wires 239 and 303 to negative side of the line 212. The usual holding circuits will then operate to maintain this circuit as long as cards continue to feed through the tabulating machine.

As the ledger and record cards are fed downwardly through the machine and pass the brushes 50 and UB respectively, these brushes will analyze the corresponding index point positions of the related columns of the two types of cards. In those positions in which the perforations are in agreement, a circuit will be completed as follows: from line 203 (Fig. 16), through cam contact T2, common contact roller of the upper brushes, a perforation in the record card, plug socket 229, plug connection 228 (see also Fig. 16a), plug socket 224, control relay coil 223 to corresponding socket 225, then through plug connection 226, socket 227, brush 50, perforation in the ledger card, common contact roller 51 to negative side of line 212.

During the transit of the cards past their respective brushes, magnets 223 will become energized in those columns which in the perforations correspond on both cards and in which suitable plug connections 226 and 228 have been made.

Energization of a coil 223 will cause closure of its point 223a and 223b to set up a holding circuit for the coil as follows: from line 203 (Fig. 16a), wire 240, relay points 223a, relay coil 223, relay points 223b, wire 241, cam contacts 242, wire 243 to negative side of line 212. Contacts 242 are controlled by a suitable cam which may be mounted on main drive shaft 19, and will release the holding circuit at a later time in the cycle of operation.

In the system in which the present invention finds particular utility, seven relay coils 223 are provided and each one is connected in series between brushes 50 and UB as explained above, so that if the ledger card classification data is in agreement with the corresponding data on the record card all these relay coils will be energized. Failure of one or more of the coils 223 to become energized due to a disagreement in the classification data in one or more of the record columns, will cause the back contacts 223c of such relay coils to remain closed. Upon the subsequent closure of a pair of contacts 244, under control of a cam on shaft 19, a circuit will be completed as follows: from line 203, solenoid coil 236, contacts 244, wire 245, contact points 223c which may be closed, wire 243 to other side of line 212. Energization of solenoid coil 236 will draw its armature upwardly and cause opening of the connection between contacts 236a. These contacts it will be recalled, are in series connection with the operating circuit of the tabulating machine which includes the driving motor TM so that opening of the contacts 236a will cause interruption of further operation of the machine. Such stopping of the machine will inform the operator that the cards are disarranged and he may then correct the arrangement.

If the classification data on the two cards is in agreement the ledger card will continue to feed downwardly until its leading edge engages the roller 70 insulating it from its contact block 71 at which time the selected line will be in position to receive printing from the supplemental printing type bar 103.

Connected in series with the contact roller 70 and block 71 is a differential relay 247 of which the circuit through one winding may be traced from line 203, wire 248, right hand coil of relay 247, to roller 70, wire 249, cam contacts 250, contacts 83 to other side of line 212. The circuit through the left hand winding may be similarly traced from wire 248, relay coil 247, wire 251, block 71, to line 212 in the same manner.

Insulation of roller 70 from its contact block 171 will deenergize the right side of the differential relay 247 which will thereupon attract its armature to close relay points 247a which in turn establishes a circuit as follows: from right side of line 212, relay points 247a, wire 252, clutch magnet 56 to left side of line 203. It will be recalled that energization of magnet 56 will disconnect the two pairs of feed rollers on shafts 43a and 43b adjacent to the printing platen 44, from the drive of the machine so that the ledger cards will be held stationary, in readiness to receive a printing impression from the type bars 103. While the ledger card is being so positioned the record card in the tabulator is moving past the lower brushes LB and, during such passage, circuits will be completed through the brushes LB to energize printing magnets 108, through circuits which may be traced as follows: from line 212 (Fig. 16), printing magnet 108, plug socket 254, suitable plug connections 255 to a socket 253 of the correspondingly selected counter order contacts 213 (closed as explained above) wire 204 to line 203.

After the record card R has completely passed the lower brushes LB, the type bars 103 in the supplemental printing device will have been positioned in accordance with the data which is to be printed upon the ledger card and printing will automatically take place on the selected line. At this time also, the control relay 223 will have been reset due to the opening of contacts 242 and the next record card will have passed the upper brushes whiles the next ledger card also passed the brushes 50 in the supplemental printing device. As long as the classification data on the two cards being compared, agree, printing will take place on the selected line of the ledger card.

*Successive posting on selected lines*

The manner in which the machine is adapted to print upon successive lines of the ledger card under control of data derived from a number of successively analyzed record cards will now be explained in connection with the wiring diagram.

For this type of operation of the machine, the comparing mechanism including relay coils 233 is not utilized and the set up devices controlled by magnets 161 are used instead. In Fig. 16a are shown two horizontal rows of magnets 161 which will hereinafter be designated as upper and lower magnets 161. Upper magnets 161 are connected to plug sockets 273 which may be connected by suitable connections 272, with plug sockets 229 of the upper brushes UB (Fig. 16). Lower magnets 161 are connected to plug sockets 271 which may be connected by suitable connections 270 with plug sockets 227 of the analyzing brushes 50. Also for this type of operation, the line finding contact roller 70 and block 71 are moved to their lowermost position wherein the contacts 83 are held open, disabling circuits through the differential relay 247. The line spacing pawl 91 and ratchet 87 are also permitted to cooperate as will be presently described.

As the ledger and record cards pass their respective brushes 50 and UB, circuits will be completed by the former to energize lower magnets 161 and by the latter to energize the upper magnets 161. A representative circuit through the record card may be traced as follows: from line 203 (Fig. 16), contacts T2, upper brushes UB, plug connection 272, upper magnet 161, wire 275 to line 212. As previously pointed out in detail, the magnets 161 will cause positioning of their associated contact devices 180 in accordance with the value of the perforations in the associated columns of the cards. The corresponding contact blocks 181 of the upper and lower devices, controlled by magnets 161 are electrically connected by means of individual wires contained in suitable cables 276. After the device has been set under control of the cards L and R a comparison is made between the two settings to determine whether or not the data analyzed is the same in both ledger and record cards. To this end a relay coil 277 is provided for each column of the device, one terminal of which is connected to the common bar 182 of the associated device. Upon closure of a pair of contacts 278 controlled by a cam carried by shaft 19, a circuit may be traced through each of the devices which are in agreement as follows: from line 212, wire 279, contacts 278, common bar 182 of the lower device, contact strip 180, contact block 181 in the position in which the contacting strip has been set, connecting wire within cable 276 to the corresponding block 181 of the upper device then to the contacting strip 180 and common strip 182 of the upper device, relay magnet 277, wire 280 to the other side of line 203.

If all the analyzed columns are found to be in agreement all the relay coils 277 will be energized causing closure of their respective contact points 277a and opening of their contact points 277b. Thereafter, upon closure of cam controlled contacts 256 a circuit will be completed from line 212, wire 257, contacts 256, relay coil 258, wire 259, relay points 277a, of the relay 277 farthest to the right and from thence serially through each of the points 277a in succession to the points 277a of the relay farthest to the left from where the circuit continues through wire 280 to other side of line 203. If one or more of the relays 277 fails to become energized, the corresponding point 277b will remain closed and upon closure of a pair of contacts 281 a circuit will be completed as follows: from line 212, wire 282, contacts 281, relay coil 283, wire 284, closed contacts 277b, wire 280 to line 203. Relay 283 will close its points 283a to complete a circuit from line 212, wire 282, points 283a, wire 285, solenoid coil 286, wire 287, to line 203. Solenoid 286 will close its point 286b to complete a circuit through the magnets 27, 28 from line 203, magnets 27 and 28 in parallel, wire 289, points 286b, wire 275 to line 212. The opening of points 286a will interrupt the circuit through the magnet 32. As explained above, the magnets 27, 28 and 32 cooperate to interrupt the feeding of the account or ledger cards so that if there is a disagreement in the classification data of the ledger and record cards so compared, further feeding of the ledger cards will be interrupted and such interruption will be an indication to the operator that a disagreement has been detected. If the ledger card is in agreement with the record card, the former will be advanced to printing position as the latter is being analyzed by the lower brushes of the tabulator.

Printing will accordingly take place on the ledger card and while such printing is taking place, the next following account and record cards L and R are being analyzed by their respective analyzing brushes. If these two cards are in disagreement, the ledger card feeding mechanism will be interrupted but the record card will continue to feed past its lower brushes and a reading taken therefrom to control the setting of the type bars in the posting device.

It will be recalled that one of the comparison devices is associated with the card feeding mechanism of the ledger cards and it will be appreciated that when such card feeding mechanism is interrupted the comparison device associated therewith will remain in position with the account number set up therein. The other of the pair of comparison devices which is associated with the driving mechanism continues to operate and to successively receive the classification data of the record cards. In this manner the successively analyzed record cards will each be compared with the setting in the other comparison device and each record card fed will control printing on a different line of the account card in a manner to be explained.

If the ledger card is found to be in agreement with the record card it will continue to feed downwardly until its highest printing line is in printing position at which time a contact cam carried by the vertical shaft 176 (Fig. 4) will close a pair of contacts to complete a circuit from line 212, contact 290, wire 291, a pair of contacts 292, (closed by a cam on main shaft 19 at the same time) solenoid coil 293, and wire 261 to other side of line 203. Energization of solenoid 293 will cause closure of its points 293a completing a circuit from line 212, wire 257, contact points 293a, magnet 56 and back to line 203.

Energization of magnet 56, in the now familiar manner, will disconnect the ledger card feeding rollers from the driving mechanism of the machine and further movement of the ledger card L will be interrupted. The timing of the machine is such that the highest printing line of the ledger card will be one position below the printing line of the platen. Closure of solenoid points 293b will complete a circuit from line 203, wire 261, wire 295, contact points 293b, wire 296, magnet 89, contacts 102 to line 212. Energization of magnet 89 as explained in connection with Fig. 12 will cause retrograde movement of the ledger card to advance it to the next printing line. If this next printing line contains information it will also have an accompanying perforation which will permit completion of the circuit as follows: from line 212, cam contacts 297 (closed at this time), wire 298, contact block 86, perforation in the ledger card, contact plunger 85, wire 299, relay coil 300, solenoid magnet 301, wire 302, closed relay points 258b, wire 261 to line 203. Closure of points 300a will provide a holding circuit for the magnet 56 running from line 212, wire 303, relay points 300a, wire 304, solenoid 293, wire 261 to line 203, points 293a will therefore be closed to maintain the magnet 56 energized through a circuit extending from line 212, wire 257, points 293a, magnet 56 to line 203. The concurrent reclosure of points 293b will effect a second energization of magnet 89 to space the ledger card to the next following line. Relay 300 is adapted to close a pair of points 300b at this point to complete a circuit from line 212, wire 333, relay points 300b, relay 238 to line 203.

It will be recalled that points 238a of the relay 238 are wired in series with the operating circuit of the tabulator and the opening of these relay points will interrupt further operation of the tabulator until the next line of the ledger card which is to receive printing, has been positioned.

It will also be recalled that the perforation associated with each printing line is made adjacent to the next higher line of the ledger card so that analysis of the last such perforation will bring the last printed line into printing position. It is necessary therefore to advance the ledger card one step further to bring the next blank line into printing position. For this purpose, the solenoid 301 is of the slow acting type and after these last spacing operations initiated by the perforations themselves, the return of the armature of the solenoid to its restored position will close a pair of contacts 306 establishing a circuit from line 212, contacts 306, wire 304, solenoid magnet 293, wire 261 to line 203. As before, energization of solenoid 293 will effect a further spacing operation of the ledger card. With the next line to receive printing in position, the relay points 238a will again close, restarting the operations of the tabulating machine to feed the next record card past the lower brushes LB and transfer the data thereon to the new line of the ledger card. Following this the momentary closure of contact 290 will effect a spacing operation, through the circuit traced above, to bring the next blank line into position. Each record card as it passes through the tabulating machine is compared in turn with the setting of the comparing device of the ledger card and as long as the two devices are in agreement, data will continue to be transferred to the ledger card under control of the lower brushes.

Upon agreement between the record card and the next ledger card, the series circuit through the relay point 277 will be completed to interrupt the further ledger card spacing operation. If the tabulating machine is arranged for group number controlling, it will at this same time register a change in group number of the record cards and will either stop or enter upon an automatic total taking cycle of operations during which the card feeding mechanism in both machines will remain inoperative.

As pointed out above, during the total taking operation of the tabulator, the printing crosshead in the supplemental printing device will operate in synchronism with the operation of the tabulator type bars and data may be printed upon the ledger cards under control of the accumulators of the tabulator. A representative circuit completed at such time is as follows:

From line 203 (Fig. 16), contacts 220, wire 221, cam contacts 219, plug socket 253, connection 255, socket 254, printing magnet 108 to line 212. The total or other data contained in the accumulators may thus be printed on a line of the ledger card when the feeding mechanisms of both parts of the machine are stationary. Following this total printing operation, the operation of the card feeding mechanism is resumed and it is desirable to remove the printed ledger card from the machine rapidly since it has been moved upwardly step by step to receive printing and may interfere with the leading edge of the next following ledger card. To this end, a circuit is completed through cam contacts 256 to energize relay coil 258, closing its points 258a so that a further circuit may be completed as already traced to energize the solenoid magnet 263, which in turn through its points 263a completes a circuit from line 212, wire 265, contact points 263a, wire 266, motor 64, wire 261 to line 203. The auxiliary motor 64 drives the two pairs of feed rollers adjacent to the printing platen 44 and which rapidly removes the card from printing position. The next ledger card is then fed to printing position and located at the next printing line in a manner described in connection with the first ledger card. During the continuous feeding of the ledger cards, it is desirable to have the step by step mechanism arranged so as not to interfere with rotation of the feeding rollers. To this end the magnet 100 is provided; and connected, as explained above, by a tape 98 with the stepping pawl 91.

With the parts in the position as shown in Fig. 16a, a circuit is completed through the magnet 100 extending from line 212, contact 102, wire 307, magnet 100, solenoid contact points 293b, wire 295, wire 261, to line 203. When the device is not used for the successive posting operation described the pawl 91 is held out of engagement with the ratchet by the lever 95 as explained in connection with Fig. 12. As also explained, the movement of this lever to its lower position will also open contacts 102 which disable the several circuits associated with the step by step operating mechanism.

As the next ledger card is advanced to printing position, the comparison device will be restored and set up in accordance with the data of the next following ledger card. This data will in turn be compared with each successively fed record card in the tabulator and until a record card is analyzed, which is in disagreement with the setting obtained from this next following ledger card, printing operations will be permitted.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is as follows:

1. In a machine of the class described, means for feeding a record having a plurality of item receiving positions, a recording position, and settable means controlled by said record for controlling said feeding means to present a selected item receiving position to said recording position.

2. In a machine of the class described, means for feeding records past a recording position, means including a pair of contacts selectively settable in the path of said record and adapted upon engagement by a record to operate said contacts to control said feeding means to present a selected section of said record to said recording position.

3. In a machine of the class described, a printing position, a settable device including a pair of contacts positionable at varying distances from said printing position, means for feeding a record past said printing position and toward said contacts and means controlled by said contacts, and effective upon arrival of the record thereat, for interrupting the operation of said feeding means.

4. In a machine adapted to be controlled by record cards, means for feeding a ledger sheet through the machine, means for feeding a plurality of record cards having similar identifying designations through the machine, means for effecting a setting of identification designations of the ledger sheet, means for comparing such designations on each of said record cards with the setting of the designations on said ledger sheet and means controlled by said record cards for effecting a record on said ledger sheet for each record card found in agreement with said setting.

5. In a machine adapted to act upon and to be controlled by record sheets, means for feeding record sheets having similar identifying designations through the machine, a ledger sheet, means for effecting a setting of predetermined designations on said ledger sheet, means for separately comparing said setting with the similar designations on each of said record sheets and record effecting means brought into operation by said comparing means to effect a record on said ledger sheet for each record sheet, when the designations being compared bear a predetermined relation to each other.

6. In a machine adapted to be acted upon and to be controlled by record sheets, ledger sheet feeding mechanism and record sheet feeding mechanism, comparing means for successively comparing identification data on said ledger sheet with identification data on a plurality of record sheets and means controlled by said comparing means, for interrupting feeding of said ledger sheets and causing further feeding of said record sheets when said data are in agreement.

7. In a card controlled machine, means for effecting a setting of identification data on a ledger sheet, means for repeatedly comparing said setting of identification data on said ledger sheet with identification data on each of a plurality of record sheets, means for sensing other data on said record sheets and means controlled by said comparing means for causing said sensing means to effect an entry on said ledger sheet for each record card whose identification data are in agreement with the identification data on the ledger sheet.

8. In a machine adapted to be controlled by perforated record sheets and perforated ledger sheets, sensing devices and a pair of comparison devices controlled thereby one for each type of sheet, comprising differentially positionable contact devices positioned in accordance with identification data on the respective sheets, feeding means for said ledger sheets and means controlled in accordance with the setting of said comparison devices for controlling the operation of said feeding means.

9. In a posting machine, a posting station, means for feeding a ledger sheet to said station, means for effecting a setting of data on said ledger sheet, means for comparing said setting of data on said sheet with data on a plurality of record cards, means controlled by said comparing means for causing a record to be posted on said ledger sheet under control of each record card in agreement therewith and means for moving said ledger sheet in increments to receive said postings in different positions on the ledger sheet.

10. In a machine adapted to be controlled by records, means for analyzing ledger cards and record cards, a set-up device controlled by each, means for comparing the settings of the set-up devices, means controlled by said comparing means for restoring both devices upon a disagreement in their setting and restoring only one of them upon an agreement.

11. In a record controlled machine, a posting station, means for feeding a ledger sheet having a plurality of entry receiving positions, past said posting station until each of said entry receiving positions has passed said station, means controlled by said sheet for effecting retrograde movement of said sheet to bring the next position to receive an entry into registration with said posting station, and means for effecting an entry in said position.

12. The invention according to claim 11 in which means is provided for effecting said retrograde movement in step by step or position by position increments.

13. The invention set forth in claim 11 in which said means for effecting retrograde movement is effective, after said entry is made, to cause further retrograde movement of the ledger sheet to present the next blank position into registration with the posting station.

14. In a record controlled machine, a printing mechanism for effecting a series of item imprints upon a classified ledger sheet, means for controlling the operation of the printing mechanism by data on a series of classified record cards, and means for effecting a setting of classification data on said sheet and comparing the classification setting of said ledger sheet with the classification of each of a corresponding series of record cards.

15. In a machine adapted to be acted upon and to be controlled by record sheets, ledger sheet feeding mechanism and record sheet feeding mechanism, means for effecting a setting of identification data on said ledger sheet, comparing means for successively comparing said setting of identification data on said ledger sheet with identification data on each of a plurality of record sheets having similar identification data and means controlled by said comparing means for controlling further operation of the machine.

CONRAD EICHENAUER.